United States Patent
Yong

(10) Patent No.: US 9,991,020 B2
(45) Date of Patent: Jun. 5, 2018

(54) RUBBER COMPOUND FOR ELECTROSTATIC DISSIPATIVE RUBBER PRODUCTS AND METHOD OF PRODUCING THE RUBBER COMPOUND

(71) Applicant: LEMBAGA GETAH MALAYSIA, Kuala Lumpur (MY)

(72) Inventor: Kok Chong Yong, Selangor (MY)

(73) Assignee: Lembaga Getah Malaysia (MY)

( * ) Notice: Subject to any disclaimer, the term of this patent is extended or adjusted under 35 U.S.C. 154(b) by 370 days.

(21) Appl. No.: 14/764,667

(22) PCT Filed: Jan. 2, 2014

(86) PCT No.: PCT/MY2014/000001
§ 371 (c)(1),
(2) Date: Jul. 30, 2015

(87) PCT Pub. No.: WO2014/123405
PCT Pub. Date: Aug. 14, 2014

(65) Prior Publication Data
US 2015/0371727 A1     Dec. 24, 2015

(30) Foreign Application Priority Data

Feb. 7, 2013   (MY) .......................... PI 2013000415

(51) Int. Cl.
| | |
|---|---|
| C08F 2/46 | (2006.01) |
| C08G 61/04 | (2006.01) |
| H01B 1/12 | (2006.01) |
| C08L 9/02 | (2006.01) |
| B29C 35/08 | (2006.01) |
| B29C 39/00 | (2006.01) |
| B29C 39/02 | (2006.01) |
| C08K 5/134 | (2006.01) |
| C08K 5/42 | (2006.01) |
| C08G 73/02 | (2006.01) |
| B29K 9/00 | (2006.01) |
| B29K 479/00 | (2006.01) |
| B29L 31/34 | (2006.01) |

(52) U.S. Cl.
CPC ......... H01B 1/128 (2013.01); B29C 35/0866 (2013.01); B29C 39/003 (2013.01); B29C 39/02 (2013.01); C08K 5/134 (2013.01); C08K 5/42 (2013.01); C08L 9/02 (2013.01); B29C 2035/0877 (2013.01); B29K 2009/00 (2013.01); B29K 2479/00 (2013.01); B29L 2031/34 (2013.01); C08G 73/0266 (2013.01)

(58) Field of Classification Search
CPC ... H01B 1/128; B29C 39/003; B29C 35/0866; B29C 39/02; B29C 2035/0877; C08L 9/02; C08L 79/02; C08G 73/0266; C08K 5/134; C08K 5/42; B29K 2009/00; B29K 2479/00; B29L 2031/34

USPC .................................. 522/151, 150, 1; 520/1
See application file for complete search history.

(56) References Cited

U.S. PATENT DOCUMENTS

| | | | | |
|---|---|---|---|---|
| 3,098,808 | A * | 7/1963 | Anderson, Jr. ......... | B29C 47/86 522/158 |
| 4,102,761 | A * | 7/1978 | Bohm ..................... | B29C 71/04 522/112 |
| 2010/0320427 | A1* | 12/2010 | Yong ........................ | C09K 3/16 252/519.33 |
| 2011/0049636 | A1 | 3/2011 | Aoyama et al. | |
| 2011/0101572 | A1 | 5/2011 | Kim et al. | |
| 2012/0286213 | A1* | 11/2012 | Yong ........................ | C09K 3/16 252/500 |

FOREIGN PATENT DOCUMENTS

| | | | | |
|---|---|---|---|---|
| EP | 0204531 | | 10/1986 | |
| EP | 0204531 | A2 * | 12/1986 | ............. B29C 59/16 |
| MY | 121912 | | 3/2006 | |

OTHER PUBLICATIONS

Mamedov, 2005, Sulfur-free vulcanization of Modified Butadiene-Acrylonitrile Rubber, Russian Journal of Applied Chemistry, vol. 78, No. 9, pp. 1531-1537 (Year: 2005).*
Zhao et al, 2011, Study on reliability of room temperature vulcanization silicone rubber and conductive composite silicon rubber reinforced by silica, 2011 International symposium on advanced packaging materials, 348-353 (Year: 2011).*
Ahmed et al, Mar. 15, 2011, The effect of gamma-irradiation on acrylonitrile-butadiene rubber NBR seal materials with different antioxidants, Materials and Design 36, 823-828 (Year: 2011).*
Yong, K.C., et al. "Conductive Poly(butadiene-co-acrylonitrile)-polyaniline dodecylbenzenesulfonate [NBR-PAni. DBSA] blends prepared in solution", European Polymer Journal, 2006, vol. 42, pp. 1716-1727.

* cited by examiner

*Primary Examiner* — Jessica Whiteley
(74) *Attorney, Agent, or Firm* — Renner Kenner Greive Bobak Taylor & Weber

(57) ABSTRACT

A rubber compound for the manufacture of electrostatic dissipative products comprising a rubber component derived from poly(butadiene-co-acrylonitrile), an electrically conductive filler component derived from sulfonic acid doped polyaniline, and an antioxidant, wherein the mixture comprising the rubber component, electrically conductive filler and antioxidant is vulcanized by exposure to electromagnetic radiation, and the vulcanized rubber compound possesses improved conductivity and tensile strength properties. A method for producing the rubber compound above comprising of providing a rubber component derived from poly(butadiene-co-acrylonitrile), an electrically conductive filler component derived from sulfonic acid doped polyaniline, and an antioxidant, then mixing the rubber component, electrically conductive filler and antioxidant together. The mixture is then molded into a suitable shape and then subjected to an electromagnetic radiation to stimulate vulcanization of the rubber mixture.

23 Claims, No Drawings

RUBBER COMPOUND FOR ELECTROSTATIC DISSIPATIVE RUBBER PRODUCTS AND METHOD OF PRODUCING THE RUBBER COMPOUND

FIELD OF INVENTION

This invention generally relates to rubber compounds. More particularly the invention relates to a rubber compound for the manufacture of electrostatic dissipative rubber products and a method for producing the rubber compound.

BACKGROUND ART

Rubber compounds are typically made out of raw latex which is mixed with a chemical vulcanisation agent such as sulphur, peroxides, metallic oxides etc. The mixture is then heated to activate the vulcanisation process to produce a firm, elastic and durable rubber compound.

Rubber compounds are usually mixed with other chemical compounds to enhance the physical properties of the compound depending on its desired end use. In normal use, rubber compounds provide high resistance between rubber and the contact surface and also good electrical insulation. However, such properties may pose certain problems during use where electrostatic charge build up during operation can prove hazardous.

In order to increase the compound's conductivity to prevent electrostatic build-up, an electrically conductive component is added to the compound prior to vulcanisation. Examples of electrically conductive components include metallic salts, small metal parts, carbon black and sulfonic acid doped polyaniline. An increased conductivity of the compound provides an electrical pathway for electrostatic charges to dissipate to the ground.

Metallic salts and metal parts are known to affect the elasticity and durability of the non-conductive rubber.

The use of carbon black as an electrically conductive component in rubber compound is known to cause staining. This is not ideal where the compound is intended for use as a consumer product.

Sulfonic acid doped polyaniline does not cause any staining unlike carbon black but it is known to cause interference with the crosslinking efficiency of chemical vulcanisation agents, especially sulphur and peroxides, during vulcanisation of the rubber compound. Poor crosslinking of the compound will result in a weak and undurable compound. To overcome this problem, electromagnetic radiation has been used to stimulate vulcanisation of the rubber compound, either solely, or in combination with chemical vulcanisation agents.

EP publication no. 0 204 531 A2 discloses a method of producing a rubber compound including the addition of chemical vulcanisation agents. The rubber component used is acrylonitrile-butadiene rubber and the chemical vulcanisation agent is peroxide. The use of chemical agents is undesirable due to its toxic nature and the potential damage to the environment. This publication teaches that the rubber compound is irradiated with low energy electron beams prior to carrying out the chemical vulcanisation process. Acceleration voltages used for irradiating the rubber compound ranges between 100 to 500 kV i.e. low energy electron beam. Low energy electron beam radiation was observed to penetrate the rubber surface only up to a few millimeters in depth. Hence, this method of vulcanisation is only effective for vulcanising very thin pieces of rubber e.g. up to 2 mm thick. No electrically conductive component is added to the rubber compound to prevent electrostatic build-up. Rather, the compound of this EP prior publication aims to provide good electrical insulation.

MY patent no. MY-121912-A discloses a method of producing a rubber compound with no added chemical vulcanisation agents. Vulcanisation is stimulated by exposing the rubber to a low energy electron beam while it is agitated within an irradiation vessel. The rubber component used includes natural rubber, synthetic rubber or a mixture of natural and synthetic rubbers such as acrylonitrile-butadiene copolymer latex. However, similar to the above EP publication, no electrically conductive components were added. From the teachings of the MY patent, it is noted that a low energy electron beam is used i.e. acceleration voltages of between 200-500 kV, and this resulted in penetration of only up to 1 mm in depth of the rubber compound, hence, the need to agitate the compound during vulcanisation. Such a method of agitating the rubber compound while radiating the compound with low energy electron beams resulted in a significantly prolonged vulcanisation time of up to 60 minutes.

US publication no. 2011/0049436 A1 discloses a rubber composition comprising acrylonitrile-butadiene rubber having carbon black as an electrically conductive component. This US publication teaches a vulcanisation process carried out using electron beam radiation with doses of 18 Mrad (180 kGy). It takes around 22 hours to complete the vulcanisation process i.e. low energy electron beam is used. As discussed above, the use of carbon black as an electrically conductive component is undesirable in many consumer applications due to staining.

Hence, there is a need for an electrostatic dissipative rubber compound for dissipating accumulated electrostatic charges without the undesirable properties such as staining and also without using chemical vulcanisation agents which are harmful to the environment.

It is also desirable to reduce the vulcanisation curing time in order to increase production levels by shortening the processing time.

This invention thus aims to alleviate some or all of the problems of the prior art.

SUMMARY OF THE INVENTION

In an aspect of the invention, there is provided a rubber compound for the manufacture of electrostatic dissipative rubber products comprising a rubber component derived from poly(butadiene-co-acrylonitrile), an electrically conductive filler component derived from sulfonic acid doped polyaniline, and an antioxidant, wherein the mixture comprising the rubber component, electrically conductive filler and antioxidant is vulcanised by exposure to high energy electromagnetic radiation, wherein said vulcanised rubber compound possesses an improved conductivity of at least about $10^{-3}$ S/cm and an increased tensile strength of at least about 12.0 MPa.

It was surprisingly discovered that vulcanisation using high energy electromagnetic radiation significantly increases the conductivity of the rubber compound. Conductivity levels of the compound of this invention were significantly higher when compared to similar rubber compounds vulcanised using sulphur as a chemical vulcanisation agent without irradiation with electromagnetic radiation.

In an embodiment, the rubber compound may comprise at least about 50.0 p.p.h.r. of a rubber component derived from poly(butadiene-co-acrylonitrile); at least about 1.0 p.p.h.r. of an electrically conductive filler component derived from sulfonic acid doped polyaniline; and at least about 0.2 p.p.h.r. of an antioxidant.

In another embodiment, the rubber compound may be vulcanised by exposure to electromagnetic radiation with acceleration voltage of at least about 0.5 mega electron volts, current of at least about 1.0 mega ampere and doses of at least about 50 kGy.

The rubber compound may comprise about 50.0 to about 99.0 p.p.h.r. of poly(butadiene-co-acrylonitrile), about 1.0 to about 50.0 p.p.h.r. of sulfonic acid doped polyaniline, and about 0.2 to about 10.0 p.p.h.r. of antioxidants.

The rubber compound may contain about 60.0 p.p.h.r. to about 80.00 p.p.h.r. of poly(butadiene-co-acrylonitrile).

The rubber compound may contain about 20.0 p.p.h.r. to about 40.00 p.p.h.r. of sulfonic acid doped polyaniline.

The rubber compound may contain about 0.5 p.p.h.r. of antioxidant.

In a further embodiment, the poly(butadiene-co-acrylonitrile) rubber may comprise about 17 to about 54 weight % of acrylonitrile content, and more preferably about 30 to about 54 weight % of acrylonitrile content.

In an embodiment, the sulfonic acid doped polyaniline used may have a protonation level of about 40.0 to about 100.0%, and more preferably about 80.0 to about 100.0%.

In a further embodiment, the antioxidants used may be selected from a group consisting of thiol, amine, phenolic or phosphite antioxidants and preferably a phenolic antioxidant.

In another embodiment, the electromagnetic radiation used may comprise gamma rays, electron beams or X-rays.

In an embodiment, the electron beam used may have an acceleration voltage of about 0.5 to about 10.0 mega electron volts, and more preferably about 2.0 mega electron volts.

In a further embodiment, the electron beam used may have a current of about 1.0 to about 10.0 mega amperes, and more preferably about 5.0 mega amperes.

In another embodiment, the electron beam used may have a dosage of about 50.0 to about 300.00 kGy, and more preferably about 75.0 to about 200.00 kGy.

In an embodiment, the rubber compound may further contain whitening agents. The whitening agent may be titanium dioxide. The rubber compound may contain between 0 to about 10.0 p.p.h.r., and more preferably about 5.0 p.p.h.r. of whitening agent.

In a second aspect of the invention, there is provided a method for manufacturing electrostatic dissipative rubber products comprising the following steps:
 i) providing a rubber component derived from poly(butadiene-co-acrylonitrile);
 ii) providing an electrically conductive filler component derived from sulfonic acid doped polyaniline;
 iii) providing an antioxidant;
 iv) mixing the rubber component, electrically conductive filler and antioxidant together;
 v) moulding the rubber mixture into a suitable shape; and
 vi) subjecting the shaped rubber mixture to high energy electromagnetic radiation to stimulate vulcanisation of the mixture.

The mixing device used in step (iv) in the above method may be an internal mechanical mixing device and or an open milling device. An injection moulding machine, an extrusion machine and/or a hot-press moulding machine may be used in step (v).

It is an aim of the present invention to provide a rubber compound for the manufacture of electrostatic dissipative products that is suitable especially, though not exclusively, for use as consumer products such as floor mats, table mats, shoe soles, gaskets and seals.

The rubber compound of this invention provides for various advantages which will be further elaborated in the following pages.

DETAILED DESCRIPTION OF THE EMBODIMENTS

The present invention is directed to a rubber compound for the manufacture of electrostatic dissipative rubber products, and a method for producing the rubber compound.
Rubber Compound The rubber compound of this invention mainly comprises a rubber component derived from poly(butadiene-co-acrylonitrile), an electrically conductive filler component derived from sulfonic acid doped polyaniline, and an antioxidant.

Poly(butadiene-co-acrylonitrile) possesses good resilience and tensile properties and is known for its high resistance to oils and chemicals. It is also known to be highly processable and compatible for use in many industries where resistance to oil or chemicals is required.

Any suitable poly(butadiene-co-acrylonitrile) rubber may be used as a rubber host for the compound of this invention. Poly(butadiene-co-acrylonitrile) with between 17 to 54 weight % of acrylonitrile content is preferred, and more particularly, 30 to 54 weight %. Poly(butadiene-co-acrylonitrile) has improved resistance to oil and chemicals with a higher weight % of acrylonitrile content. The rubber compound may contain 50.0 parts per hundred rubber (p.p.h.r.) to 99.00 p.p.h.r. of poly(butadiene-co-acrylonitrile) and, preferably about 60.0 p.p.h.r. to about 80.00 p.p.h.r.

Polyaniline is a stable, easy to synthesize conducting polymer that possesses high electrical conductivity. Polyaniline undergoes doping upon mixing with sulfonic acid to increase its conductivity. However, the presence of sulfonic acid in a rubber mixture is known to cause crosslinking problems during vulcanisation using chemical agents such as sulphur and peroxides.

Sulfonic acid doped polyaniline is used as an electrically conductive component in the compound of the present invention. The sulfonic acid doped polyaniline used may have a protonation level of 40.0 to 100.0%, and more preferably 80.0 to 100.0%. Electrical conductivity of sulfonic acid doped polyaniline increases with its protonation level. The compound may contain about 1.0 to about 50.0 p.p.h.r. of this conductive component, and more preferably 20.0 p.p.h.r. to 40.00 p.p.h.r.

Antioxidants are added to further increase the durability of the rubber compound. Any suitable antioxidant may be used. The antioxidants used may be selected from a group consisting of thiol, amine, phenolic or phosphite antioxidants. Preferably, a phenolic antioxidant is used because of its non-colouring and non-staining properties compared to other antioxidants. The antioxidant may be added in an amount of 0.2 to 10.0 p.p.h.r., and preferably 0.5 p.p.h.r.

Advantageously, no chemical vulcanisation agents are used in the present invention. Chemical vulcanisation agents are known to be environmentally damaging. It is also difficult to separate excess chemical remnants from the rubber compound upon completion of the vulcanisation process, thus, resulting in chemical residues in the rubber compound.

The rubber compound may further comprise whitening agents which can allow for greater flexibility of adding any colouring into the rubber compound that may be appropriate for the desired end product. Any suitable whitening agent may be used, and preferably titanium dioxide. The whitening agent may be added in an amount of 0 to 10.0 p.p.h.r., and preferably 5.0 p.p.h.r.

Method of Producing Rubber Compound

The method for producing the rubber compound of the present invention mainly comprises the following steps:
i) providing a rubber component derived from poly(butadiene-co-acrylonitrile);
ii) providing an electrically conductive filler component derived from sulfonic acid doped polyaniline;
iii) providing an antioxidant;
iv) mixing the rubber component, electrically conductive filler and antioxidant together;
v) moulding the rubber mixture into a suitable shape; and
vi) subjecting the shaped rubber mixture to high energy electromagnetic radiation to stimulate vulcanisation of the mixture.

Details of the rubber component, electrically conductive component, and antioxidant used in the method of this invention are as explained in the preceding section describing the rubber compound.

In the mixing step (iv), firstly, the rubber component and electrically conductive filler are added simultaneously in any suitable mixing machine such as an open milling machine, internal mechanical mixing machine, etc. The antioxidant is added subsequently to the rubber component and electrically conductive mixture. Mixing of the components is carried out until a homogenous mixture is produced.

The mixing of step (iv) may be conducted in an internal mechanical mixing device with the following parameters:
i) temperatures ranging from about 70.0 to about 200.0° C., and preferably about 150.0° C.;
ii) fill factors about 0.60 to about 0.90, and preferably about 0.70; and
iii) rotor turning speed of about 30 to about 150 revolutions per minute (rpm), and preferably about 100 rpm.

Whitening agents may be added, if necessary, after step (iv) and before step (v).

Once the rubber component, electrically conductive filler and antioxidants are mixed to form a homogenous mixture, the whitening agent, if any, may be added to the mixture. This is done in a separate pre-warmed mixing machine, preferably an open milling machine, with temperatures ranging from about 30.0 to about 90.0° C., and preferably about 50.0° C.

The homogenous rubber mixture may then be moulded into suitable shapes and dimensions depending on its desired end use using any suitable moulding machine. An example of a moulding machine may be a hot press-moulding machine with temperatures ranging from about 120.0 to about 200.0° C., and preferably about 150.0° C.

The resulting shaped rubber compound is then sent for vulcanisation.

Advantageously, no chemical vulcanisation agents are used in the method of this invention. Instead, the rubber compound is exposed to high energy electromagnetic radiation to stimulate vulcanisation of the rubber compound.

The electromagnetic radiation used for stimulating vulcanisation may be of any suitable radiation such as gamma rays, electron beams or X-rays. Preferably, electron beam radiation may be used. High energy electromagnetic radiation allows for a shorter vulcanisation process and a higher processing rate and hence a higher output. It was also found that exposing the rubber compound to high energy electromagnetic radiation aids in increasing the conductivity of the vulcanised rubber compound. This is likely due to the increased number of free radicals, which are generated during the radiation process, trapped within the rubber compound's molecular structure that enhances the conductivity of the compound. Conductivity of vulcanised rubber using chemical agents such as sulphur, exhibits substantially lower conductivity values when compared to the rubber compound of the present invention.

Further, it is easier to control the degree of cross-linking of the rubber compound via the dosage of electromagnetic radiation used compared to vulcanisation using chemical agents. It is also a comparatively faster and cleaner process. The vulcanisation process using high energy electron beam can be completed within several minutes instead of several hours using low energy electron beam radiation. There are no unwanted chemical agent residues in the end product.

The electron beam acceleration voltage used may be of any suitable voltage to stimulate vulcanisation of the rubber compound. In the present invention, the acceleration voltage is 0.5 to 10.0 mega electron volts, and more preferably 2.0 mega electron volts.

The electron beam current used may be of any suitable amperage to stimulate vulcanisation of the rubber compound. In the present invention, the current is 1.0 to 10.0 mega amperes, and more preferably 5.0 mega amperes. The values of the acceleration voltage and current will result in high energy electromagnetic radiation during the vulcanisation process.

The electron beam dosage used may be of any suitable dosage to complete the vulcanisation of the rubber compound. In the present invention, the dosage is 50.0 to 300.00 kGy, and more preferably 75.0 to 200.00 kGy. The degree of cross-linking of the rubber compound increases as the dosage of electromagnetic radiation increases.

The resulting vulcanised rubber compound has been observed to exhibit an improved conductivity of at least about $10^{-3}$ S/cm to about $10^{-1}$ S/cm after vulcanisation with electromagnetic radiation. The rubber compound, prior to vulcanisation by electron beam radiation, exhibits lower conductivity values of about $10^{-4}$ S/cm. It is evident that high energy electromagnetic radiation significantly improves the conductivity of the rubber compound. High conductivity improves the electrostatic dissipation properties of the rubber compound and prevents build-up of electrostatic charges on the surface.

The vulcanised rubber compound also has been observed to exhibit good tensile strength values of at least about 12 MPa i.e. significantly better than a sulphur-vulcanised rubber compound. It is found that tensile strength values increases significantly when the rubber compound is exposed to higher doses of electromagnetic radiation. This is likely due to the higher cross-linking degree of the rubber compound when exposed to higher doses of electromagnetic radiation. This phenomenon of higher tensile strength was also surprisingly observed when higher amounts of electrically conductive filler were added to the compound. Usually when higher amounts of filler are added, the tensile strength of the rubber compound significantly decreases. High tensile strength will increase the durability of the rubber compound when it is used as a consumer product.

After vulcanisation is complete, the vulcanised rubber compound may be sent for further downstream processing for the manufacture of electrostatic dissipative products that is suitable especially, though not exclusively, for use as floor mats, table mats, shoe soles, gaskets and seals.

EXAMPLES

The following Examples illustrate the various aspects, methods and steps of the process of this invention. These Examples do not limit the invention, the scope of which is set out in the appended claims.

Example 1

Preparation of poly(butadiene-co-acrylonitrile)-polyaniline dodecylbenzenesulfonate Compounds Poly(butadiene-co-acrylonitrile)-dodecylbenzenesulfonic acid doped polyaniline compounds with different compositions [in p.p.h.r.] of poly(butadiene-co-acrylonitrile) [48 weight % of acrylonitrile content]: dodecylbenzenesulfonic acid doped polyaniline [with protonation level, 48%], i.e. 99:1, 97.5:2.5, 95:5, 92.5:7.5, 90:10, 80:20, 70:30, 60:40 and 50:50 are prepared by using an internal mechanical mixing machine. A fill factor of 0.70 (from the total free volume of the machine's mixing chamber) is used to perform all mixings. The starting temperature for each mixing is 150° C. The rotor speed is 100 r.p.m. Stages of each mixing are as described in Table 1:

TABLE 1

Stages of Preparation of Poly(butadiene-co-acrylonitrile)-Dodecylbenzenesulfonic Acid doped Polyaniline Compounds by using An Internal Mechanical Mixing Machine

| Stage of mixing | Timing |
|---|---|
| 1. Addition of poly(butadiene-co-acrylonitrile) | $0^{th}$ minute |
| 2. Addition of dodecylbenzenesulfonic acid doped polyaniline | $1^{st}$ minute |
| 3. Addition of tetrakis-methylene-(3,5-di-tert-butyl-4-hydroxy-hydrocinnamate) methane | $2^{nd}$ minute |
| 4. Sweeping | $3^{rd}$ minute |
| 5. Dumping | $6^{th}$ minute (Total time = 6 minutes) |

0.5 p.p.h.r. of tetrakis-methylene-(3,5-di-tert-butyl-4-hydroxy-hydrocinnamate) methane (a phenolic typed antioxidant) is added to each of the poly(butadiene-co-acrylonitrile)-dodecylbenzenesulfonic acid doped polyaniline compounds during the mixing (as described by Table 1). 5.0 p.p.h.r. of titanium dioxide whitening agent is also added to each of the poly(butadiene-co-acrylonitrile)-dodecylbenzenesulfonic acid doped polyaniline compounds on a pre-warmed (temperature of 50° C.) open milling machine. Each of the poly(butadiene-co-acrylonitrile)-dodecylbenzenesulfonic acid doped polyaniline compounds is then removed from the open milling machine after 6 minutes of total mixing period.

Example 2

Electrical Properties of the poly(butadiene-co-acrylonitrile)-polyaniline dodecylbenzenesulfonic acid Dope Polyaniline Compounds Prior to Vulcanisation Using Electron Beam Radiation Poly(butadiene-co-acrylonitrile)-dodecylbenzenesulfonic acid doped polyaniline compound prior to vulcanisation by using the electron beam radiation method (as described in Example 1) showing the electrical conductivity (measured using Van der Pauw 4-probes method) as summarised in Table 2.

TABLE 2

Orders of Electrical Conductivity (in the unit of S/cm) for Non-Radiated Poly(butadiene-co-acrylonitrile)-Dodecylbenzenesulfonic Acid doped Polyaniline Compounds.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-12}$ |
| 97.5:2.5 | $\times 10^{-10}$ |
| 95:5.0 | $\times 10^{-9}$ |
| 92.5:7.5 | $\times 10^{-8}$ |
| 90:10 | $\times 10^{-6}$ |
| 80:20 | $\times 10^{-4}$ |
| 70:30 | $\times 10^{-3}$ |
| 60:40 | $\times 10^{-3}$ |
| 50:50 | $\times 10^{-2}$ |

Example 3

Vulcanisation of poly(butadiene-co-acrylonitrile)-dodecylbenzenesulfonic acid doped polyaniline Compounds By Using Electron Beam Radiation Each of the prepared compounds is fed into a mould and hot pressed at temperatures of 120° C. in order to produce a desired shape. Each of the pre-shaped compounds is then sent for electron beam radiation by using the EPS 3000 Electron Beam Radiator. Acceleration voltage of 2.0 mega electron volts and beam current of 5.0 mega amperes are applied. Five respective fixed radiation doses are used, i.e. 50 kGy, 75 kGy, 150 kGy, 200 kGy and 300 kGy.

Example 4

Electrical and Tensile Properties of the poly(butadiene-co-acrylonitrile)-polyaniline dodecylbenzenesulfonic acid Dope Polyaniline Compounds Vulcanised Using Electron Beam Radiation Poly(butadiene-co-acrylonitrile)-dodecylbenzenesulfonic acid doped polyaniline compounds vulcanised by using the electron beam radiation method (as described in Examples 1 and 3) showing the electrical conductivity (measured using Van der Pauw 4-probes method) as summarised in Tables 3 to 7, which renders the material suitable for the manufacture of electrostatic dissipative products, in particularly electrostatic dissipative floor mats, table mats, shoe soles, gaskets and seals.

TABLE 3

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 50 kGy.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-10}$ |
| 97.5:2.5 | $\times 10^{-9}$ |
| 95:5.0 | $\times 10^{-8}$ |
| 92.5:7.5 | $\times 10^{-7}$ |

TABLE 3-continued

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 50 kGy.

| Blend [poly(butadiene-co-acrylonitrile):polyaniline dodecylbenzenesulfonate] (p.p.h.r.) | Electrical Conductivity Order (S/cm) |
|---|---|
| 90:10 | $\times 10^{-5}$ |
| 80:20 | $\times 10^{-3}$ |
| 70:30 | $\times 10^{-2}$ |
| 60:40 | $\times 10^{-2}$ |
| 50:50 | $\times 10^{-1}$ |

TABLE 4

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 75 kGy.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-10}$ |
| 97.5:2.5 | $\times 10^{-9}$ |
| 95:5.0 | $\times 10^{-8}$ |
| 92.5:7.5 | $\times 10^{-6}$ |
| 90:10 | $\times 10^{-5}$ |
| 80:20 | $\times 10^{-3}$ |
| 70:30 | $\times 10^{-2}$ |
| 60:40 | $\times 10^{-2}$ |
| 50:50 | $\times 10^{-1}$ |

TABLE 5

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 150 kGy.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-10}$ |
| 97.5:2.5 | $\times 10^{-9}$ |
| 95:5.0 | $\times 10^{-7}$ |
| 92.5:7.5 | $\times 10^{-6}$ |
| 90:10 | $\times 10^{-5}$ |
| 80:20 | $\times 10^{-3}$ |
| 70:30 | $\times 10^{-2}$ |
| 60:40 | $\times 10^{-2}$ |
| 50:50 | $\times 10^{-1}$ |

TABLE 6

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 200 kGy.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-10}$ |
| 97.5:2.5 | $\times 10^{-9}$ |
| 95:5.0 | $\times 10^{-7}$ |
| 92.5:7.5 | $\times 10^{-6}$ |
| 90:10 | $\times 10^{-5}$ |
| 80:20 | $\times 10^{-3}$ |
| 70:30 | $\times 10^{-2}$ |
| 60:40 | $\times 10^{-2}$ |
| 50:50 | $\times 10^{-1}$ |

TABLE 7

Orders of Electrical Conductivity (in the unit of S/cm) for Poly(butadiene-co-acrylonitrile)-Dodecylbenzenesulfonic Acid doped Polyaniline Compounds vulcanised by using Electron Beam Radiation at Dose, 300 kGy.

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-10}$ |
| 97.5:2.5 | $\times 10^{-9}$ |
| 95:5.0 | $\times 10^{-7}$ |
| 92.5:7.5 | $\times 10^{-6}$ |
| 90:10 | $\times 10^{-5}$ |
| 80:20 | $\times 10^{-3}$ |
| 70:30 | $\times 10^{-2}$ |
| 60:40 | $\times 10^{-2}$ |
| 50:50 | $\times 10^{-1}$ |

Poly(butadiene-co-acrylonitrile)-dodecylbenzenesulfonic acid doped polyaniline compounds vulcanised by using the electron beam radiation method (as described in Examples 1 and 3) have tensile strength values (measured at non-aged condition, according to the standard, i.e. BS ISO 37-2005) as summarised in Tables 8 to 12.

TABLE 8

Tensile Strengths (MPa) for Poly(butadiene-co-acrylonitrile)-Dodecylbenzenesulfonic Acid doped Polyaniline Compounds vulcanised by using Electron Beam Radiation at Dose, 50 kGy.

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 4.25 |
| 97.5:2.5 | 5.33 |
| 95:5.0 | 7.16 |
| 92.5:7.5 | 10.54 |
| 90:10 | 12.61 |
| 80:20 | 16.18 |
| 70:30 | 15.37 |
| 60:40 | 13.59 |
| 50:50 | 12.04 |

TABLE 9

Tensile Strengths (MPa) for Poly(butadiene-co-acrylonitrile)-Dodecylbenzenesulfonic Acid doped Polyaniline Compounds vulcanised by using Electron Beam Radiation at Dose, 75 kGy.

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 5.01 |
| 97.5:2.5 | 6.05 |
| 95:5.0 | 7.89 |
| 92.5:7.5 | 11.22 |
| 90:10 | 13.12 |
| 80:20 | 16.80 |
| 70:30 | 15.96 |
| 60:40 | 14.25 |
| 50:50 | 12.80 |

TABLE 10

Tensile Strengths (MPa) for Poly(butadiene-co-acrylonitrile)-Dodecylbenzenesulfonic Acid doped Polyaniline Compounds vulcanised by using Electron Beam Radiation at Dose, 150 kGy.

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 6.69 |
| 97.5:2.5 | 7.23 |
| 95:5.0 | 8.97 |
| 92.5:7.5 | 12.47 |
| 90:10 | 15.37 |
| 80:20 | 18.63 |
| 70:30 | 17.17 |
| 60:40 | 16.40 |
| 50:50 | 14.65 |

TABLE 11

Tensile Strengths (MPa) for Poly(butadiene-co-acrylonitrile)-Dodecylbenzenesulfonic Acid doped Polyaniline Compounds vulcanised by using Electron Beam Radiation at Dose, 200 kGy.

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 7.72 |
| 97.5:2.5 | 8.28 |
| 95:5.0 | 10.11 |
| 92.5:7.5 | 13.54 |
| 90:10 | 16.32 |
| 80:20 | 19.47 |
| 70:30 | 17.89 |
| 60:40 | 17.05 |
| 50:50 | 15.18 |

TABLE 12

Tensile Strengths (MPa) for Poly(butadiene-co-acrylonitrile)-Dodecylbenzenesulfonic Acid doped Polyaniline Compounds vulcanised by using Electron Beam Radiation at Dose, 300 kGy.

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 8.51 |
| 97.5:2.5 | 9.30 |
| 95:5.0 | 10.93 |
| 92.5:7.5 | 14.25 |
| 90:10 | 17.16 |
| 80:20 | 20.50 |
| 70:30 | 18.27 |
| 60:40 | 17.33 |
| 50:50 | 15.84 |

Example 5

Preparation of Sulphur-Vulcanised poly(butadiene-co-acrylonitrile)-polyaniline dodecylbenzenesulfonate Compounds Poly(butadiene-co-acrylonitrile)-polyaniline dodecylbenzenesulfonate blend masterbatches with different compositions [in parts per hundred rubber, p.p.h.r.] of poly(butadiene-co-acrylonitrile) [grade with 48 weight % of acrylonitrile contents]: polyaniline dodecylbenzenesulfonate [with protonation level, 48%], i.e. 99:1, 97.5:2.5, 95:5, 92.5:7.5, 90:10, 80:20, 70:30, 60:40 and 50:50 are prepared by using an internal mixing machine. Mixing conditions are the same used for the electron beam irradiation technique.

Stages of each mixing are as described in Table 13:

TABLE 13

Stages of Preparation of Sulphur Vulcanisation System Containing Poly(butadiene-co-acrylonitrile)-Polyaniline Dodecylbenzenesulfonate Compound by using an Internal Mixing Machine

| Stage of mixing | Timing |
|---|---|
| 1. Addition of poly(butadiene-co-acrylonitrile) | $0^{th}$ minute |
| 2. Addition of polyaniline dodecylbenzenesulfonate and dispersing agent | $1^{st}$ minute |
| 3. Addition of tetrakis-methylene-(3,5-di-terbutyl-4-hydrocinnamate) methane | $2^{nd}$ minute |
| 4. Sweeping | $3^{th}$ minute |
| 5. Dumping | $6^{th}$ minute |
| | (Total time = 6 minutes) |

0.5 p.p.h.r. of tetrakis-methylene-(3,5-di-terbutyl-4-hydrocinnamate) methane (as the antioxidant) is added to each of the poly(butadiene-co-acrylonitrile)-polyaniline dodecylbenzenesulfonate compounds during the mixing. 5.0 p.p.h.r. of titanium dioxide (as the whitening agent), 0.5 p.p.h.r of sulphur, 3.5 p.p.h.r. of benzothiazole disulphide (as the vulcanisation system's accelerator), 5.0 p.p.h.r of zinc oxide and 2.0 p.p.h.r. of stearic acid (both as the vulcanisation system's activators) are added to each of the poly(butadiene-co-acrylonitrile)-polyaniline dodecylbenzenesulfonate compounds on a pre-warmed (temperature of 50° C.) open milling machine. Each of the sulphur vulcanisation system containing poly(butadiene-co-acrylonitrile)-polyaniline dodecylbenzenesulfonate compounds is then removed from the open milling machine after 12 minutes of total mixing period.

Appropriate amounts of each of the sulphur vulcanisation system containing poly(butadiene-co-acrylonitrile)-polyaniline dodecylbenzenesulfonate compounds are fed into a mould. The mould together with the sulphur vulcanisation system containing poly(butadiene-co-acrylonitrile)-polyaniline dodecylbenzenesulfonate compound are sent for hot pressing and curing at temperature of 180±2° C.

Example 6

Electrical and Tensile Properties of the Sulphur-Vulcanised poly(butadiene-co-acrylonitrile)-polyaniline dodecylbenzenesulfonate Compounds Sulphur-vulcanised poly(butadiene-co-acrylonitrile)-polyaniline dodecylbenzenesulfonate compounds (as described in Example 5) show the electrical conductivity (measured using Van der Pauw 4-probes method) as summarised in Tables 14 and 15.

TABLE 14

Orders of Electrical Conductivity (S/cm) for Sulphur-Vulcanised-Poly(butadiene-co-acrylonitrile)-Polyaniline Dodecylbenzenesulfonate Blends

| Blend [poly(butadiene-co-acrylonitrile):polyaniline dodecylbenzenesulfonate] (p.p.h.r.) | Electrical Conductivity Order (S/cm) |
|---|---|
| 99:1.0 | $\times 10^{-11}$ |
| 97.5:2.5 | $\times 10^{-10}$ |
| 95:5.0 | $\times 10^{-9}$ |
| 92.5:7.5 | $\times 10^{-8}$ |
| 90:10 | $\times 10^{-6}$ |
| 80:20 | $\times 10^{-4}$ |
| 70:30 | $\times 10^{-3}$ |
| 60:40 | $\times 10^{-3}$ |
| 50:50 | $\times 10^{-2}$ |

TABLE 15

Tensile Strengths (MPa) for Sulphur-Vulcanised-Poly(butadiene-co-acrylonitrile)-Polyaniline Dodecylbenzenesulfonate Blends

| Blend [poly(butadiene-co-acrylonitrile):polyaniline dodecylbenzenesulfonate] (p.p.h.r.) | Tensile Strength ± 0.50 (MPa) |
|---|---|
| 99:1.0 | 6.83 |
| 97.5:2.5 | 8.42 |
| 95:5.0 | 10.33 |
| 92.5:7.5 | 10.61 |
| 90:10 | 12.24 |
| 80:20 | 17.12 |
| 70:30 | 14.15 |
| 60:40 | 13.93 |
| 50:50 | 11.86 |

CONCLUSION

The above examples illustrates the electrical conductivities and tensile strengths of each poly(butadiene-co-acrylonitrile)-dodecylbenzenesulfonic acid doped polyaniline compounds vulcanised using electron beam radiation method prepared according to Examples 1 and 3. From the results, it is apparent that the compounds with higher contents of added dodecylbenzenesulfonic acid doped polyaniline show higher electrical conductivities. It is also observed that the compounds vulcanised at higher electron beam radiation doses show higher tensile strength values.

For sulphur-vulcanised poly(butadiene-co-acrylonitrile)-dodecylbenzenesulfonic acid doped polyaniline prepared according to Example 5, it is apparent that the electrical conductivities of compounds prepared by using sulphur vulcanisation method are lower than the electron beam irradiated compounds. Tensile strengths of compounds prepared using the sulphur vulcanisation method are also lower than the electron beam irradiated ones. The highest tensile strength obtained for the electron beam irradiated compound is 20.50±0.50 MPa at 300 kGy of radiation dosage. However, for the sulphur vulcanised compound, the highest tensile strength value is only 17.12±0.50 MPa.

In conclusion, compounds with 5.0 p.p.h.r. or above of added dodecylbenzenesulfonic acid doped polyanili ne and vulcanised at electron beam radiation doses 75 kGy to 200 kGy exhibit the most desirable properties as compared to the other compounds prepared according to the method of the present invention.

As will be readily apparent to those skilled in the art, the present invention may easily be produced in other specific forms without departing from its scope.

The invention claimed is:

1. A rubber compound for the manufacture of electrostatic dissipative rubber products comprising:
   a rubber component derived from poly(butadiene-co-acrylonitrile);
   an electrically conductive filler component derived from sulfonic acid doped polyaniline; and
   an antioxidant,
   characterised in that the mixture comprising the rubber component, electrically conductive filler and antioxidant is vulcanised solely by exposure to high energy electromagnetic radiation;
   wherein said electromagnetic radiation dosage is about 75.0 to about 300.00 kGy; and
   wherein said vulcanised rubber compound possesses an improved conductivity of at least about $10^{-3}$ S/cm and an increased tensile strength of at least about 12.0 MPa.

2. The rubber compound according to claim 1, wherein said compound comprises:
   at least about 50.0 p.p.h.r. of a rubber component derived from poly(butadiene-co-acrylonitrile);
   at least about 1.0 p.p.h.r. of an electrically conductive filler component derived from sulfonic acid doped polyaniline; and
   at least about 0.2 p.p.h.r. of an antioxidant.

3. The rubber compound according to claim 1, wherein said rubber component, electrically conductive filler and antioxidant is vulcanised by exposure to high energy electromagnetic radiation with acceleration voltage of at least about 0.5 mega electron volts, current of at least about 1.0 mega ampere and doses of at least about 50 kGy.

4. The rubber compound according to claim 1, wherein said compound comprises:
   about 50.0 to about 99.0 p.p.h.r. of poly(butadiene-co-acrylonitrile);
   about 1.0 to about 50.0 p.p.h.r. of sulfonic acid doped polyaniline; and
   about 0.2 to about 10.0 p.p.h.r. of antioxidants.

5. The rubber compound according to claim 4, wherein said compound contains about 60.0 p.p.h.r. to about 80.00 p.p.h.r. of poly(butadiene-co-acrylonitrile).

6. The rubber compound according to claim 4, wherein said compound contains about 20.0 p.p.h.r. to about 40.00 p.p.h.r. of sulfonic acid doped polyaniline.

7. The rubber compound according to claim 4, wherein said compound contains about 0.5 p.p.h.r. of antioxidant.

8. The rubber compound according to claim 1, wherein said poly(butadiene-co-acrylonitrile) rubber comprises about 17 to about 54 weight % of acrylonitrile content.

9. The rubber compound according to claim 8, wherein said poly(butadiene-co-acrylonitrile) rubber comprises about 30 to about 54 weight % of acrylonitrile content.

10. The rubber compound according to claim 1, wherein said sulfonic acid doped polyaniline has a protonation level of about 40.0 to about 100.0%.

11. The rubber compound according to claim 10, wherein said sulfonic acid doped polyaniline has a protonation level of about 80.0 to about 100.0%.

12. The rubber compound according to claim 1, wherein said antioxidants used is selected from a group consisting of thiol, amine, phenolic or phosphite antioxidants.

13. The rubber compound according to claim 12, wherein said antioxidants is a phenolic antioxidant.

14. The rubber compound according to claim 1, wherein said electromagnetic radiation used comprises gamma rays, electron beams or X-rays.

15. The rubber compound according to claim 14, wherein said electron beam acceleration voltage is about 0.5 to about 10.0 mega electron volts.

16. The rubber compound according to claim 14, wherein said electron beam acceleration voltage is about 2.0 mega electron volts.

17. The rubber compound according to claim 14, wherein said electron beam current is about 1.0 to about 10.0 mega amperes.

18. The rubber compound according to claim 14, wherein said electron beam current is about 5.0 mega amperes.

19. The rubber compound according to claim 14, wherein said electron beam dosage is about 75.0 to about 200.00 kGy.

20. The rubber compound according to claim 1, wherein said compound further comprises whitening agents.

21. The rubber compound according to claim 20, wherein said whitening agents is titanium dioxide.

22. The rubber compound according to claim 20, wherein said compound contains between 0 to about 10.0 p.p.h.r. of whitening agent.

23. A method for manufacturing the rubber compound of claim 1 comprising the steps of:
   i) providing a rubber component derived from poly(butadiene-co-acrylonitrile);
   ii) providing an electrically conductive filler component derived from sulfonic acid doped polyaniline;
   iii) providing an antioxidant;
   iv) mixing the rubber component, electrically conductive filler and antioxidant together;
   v) moulding the rubber mixture into a suitable shape to form shaped rubber portions; and
   vi) vulcanizing the shaped rubber portions solely using high energy electromagnetic radiation, wherein the dosage of the high energy electromagnetic radiation is about 75.0 to about 300.0 kGy.

* * * * *